(12) United States Patent
Khoryaev et al.

(10) Patent No.: US 12,058,562 B2
(45) Date of Patent: Aug. 6, 2024

(54) QOS-AWARE CONGESTION CONTROL, RESOURCE ALLOCATION AND IN-DEVICE COEXISTENCE SOLUTIONS FOR NR V2X SIDELINK COMMUNICATIONS

(71) Applicant: Apple Inc., Cupertino, CA (US)

(72) Inventors: Alexey Khoryaev, Nizhny Novgorod (RU); Sergey Panteleev, Nizhny Novgorod (RU); Mikhail Shilov, Nizhny Novgorod (RU); Sergey Sosnin, Zavolzhie (RU)

(73) Assignee: Apple Inc., Cupertino, CA (US)

( * ) Notice: Subject to any disclaimer, the term of this patent is extended or adjusted under 35 U.S.C. 154(b) by 145 days.

(21) Appl. No.: 17/286,556

(22) PCT Filed: Oct. 31, 2019

(86) PCT No.: PCT/US2019/059056
§ 371 (c)(1),
(2) Date: Apr. 19, 2021

(87) PCT Pub. No.: WO2020/092706
PCT Pub. Date: May 7, 2020

(65) Prior Publication Data
US 2021/0385685 A1 Dec. 9, 2021

Related U.S. Application Data
(60) Provisional application No. 62/754,476, filed on Nov. 1, 2018.

(51) Int. Cl.
*H04W 28/02* (2009.01)
*H04L 1/00* (2006.01)
(Continued)

(52) U.S. Cl.
CPC ....... *H04W 28/0289* (2013.01); *H04L 1/0003* (2013.01); *H04W 4/40* (2018.02);
(Continued)

(58) Field of Classification Search
CPC ... H04W 28/0289; H04W 4/40; H04W 72/56; H04W 72/542; H04W 72/02
See application file for complete search history.

(56) References Cited

U.S. PATENT DOCUMENTS

| 10,757,030 B2 * | 8/2020 | Loehr | H04L 5/0064 |
| 11,076,315 B2 * | 7/2021 | Lee | H04W 4/40 |

(Continued)

FOREIGN PATENT DOCUMENTS

| EP | 3255950 A1 | 12/2017 |
| WO | 2018016157 A1 | 1/2018 |

(Continued)

OTHER PUBLICATIONS

International Preliminary Report on Patentability dated Apr. 27, 2021 in connection with PCT Application No. PCT/US2019/059056.

(Continued)

*Primary Examiner* — Won Tae C Kim
(74) *Attorney, Agent, or Firm* — Eschweiler & Potashnik, LLC (57) ABSTRACT

A user equipment (UE), gNodeB or network component can be configured to support Quality of Service (QoS) aware sidelink communications for vehicle to everything (V2X) communication operations. The QoS aware sidelink communications can include operating QoS congestion control, QoS control and adaptation, QoS aware resource allocation, QoS aware in-device coexistence operations, as well as sensing and reservation based on sidelink resource allocations. Transmitter constraints can be provided according to (Continued)

a Quality of Service (QoS) aware congestion control that enables a fair usage of spectrum resources with one or more V2X devices, based on QoS attributes. Different V2X packets can be scheduled/filtered based on combinations of the QoS attributes. A priority of one radio access technology (RAT) over another can be made based on the QoS attributes associated with the different V2X packets being delivered in sidelink transmissions for a QoS aware in-device coexistence operation.

19 Claims, 7 Drawing Sheets

(51) Int. Cl.
*H04W 4/40* (2018.01)
*H04W 72/02* (2009.01)
*H04W 72/542* (2023.01)
*H04W 72/56* (2023.01)

(52) U.S. Cl.
CPC ... *H04W 28/0268* (2013.01); *H04W 28/0273* (2013.01); *H04W 72/02* (2013.01); *H04W 72/542* (2023.01); *H04W 72/56* (2023.01)

(56) References Cited

U.S. PATENT DOCUMENTS

| | | | |
|---|---|---|---|
| 2019/0089498 A1 | 3/2019 | Pelletier et al. | |
| 2019/0174547 A1* | 6/2019 | Khoryaev | H04W 4/46 |
| 2020/0077433 A1* | 3/2020 | Lin | H04W 72/0446 |
| 2021/0289473 A1* | 9/2021 | Chae | H04W 4/46 |

FOREIGN PATENT DOCUMENTS

| | | |
|---|---|---|
| WO | 2018054243 A1 | 3/2018 |
| WO | 2018064131 A1 | 4/2018 |
| WO | 2018075828 A1 | 4/2018 |
| WO | 2018084590 A1 | 5/2018 |
| WO | 2018153453 A1 | 8/2018 |

OTHER PUBLICATIONS

PCT Search Report dated Feb. 20, 2020 in connection with PCT Application No. PCT/US2019/059056.
PCT Written Opinion dated Feb. 20, 2020 in connection with PCT Application No. PCT/US2019/059056.
Qualcomm Incorporated,'Co-existence aspects for NR-V2X and LTE-V2X', R1-1811268, 3GPP TSG RAN WG1 Meeting #94bis, Chengdu, China, Sep. 29, 2018 sections 2.3, 3.
Intel Corporation,'On QoS Management for NR V2X Communication', R1-1810780, 3GPP TSG RAN WG1 Meeting #94bis, Chengdu, China, Sep. 29, 2018 sections 3-4.
Chinese Office Action, Mailed Date: Nov. 29, 2023, in connection with Chinese Patent Application No. 201980066170.0.
36300_CR1199_(REL-1 5)_R2-1814472_Correcti on on V2X sidelink communication in TS 36.300; 3GPP tsg_ranwg2_rl2; Sep. 28, 2018.
InterDigital,R2-1814018 "Qos Management for NR V2X"; 3GPP tsg_ranwg2_rl2,tsgr2_103bis; Sep. 28, 2018.
Qualcomm Incorporated, Co-existence aspects for NR-V2X and LTE-V2X; 3GPP TSG RAN WG1 Meeting #94bis R1-1811268; Sep. 29, 2018.

* cited by examiner

| Logical SL TX Priority | Traffic/packet priority | Latency/PDB | Reliability | Range | V2X Service |
|---|---|---|---|---|---|
| 0 (highest) | 0 (highest) | < 3 ms | >99.99% | < 50m | Service 0 |
| 1 | 1 (highest) | 3 ms<L<20ms | >99% | < 50m | Service 0 |
| 100 (lowest) | 8 (highest) | 200 ms < L | >90% | < 100m | Service 15 |

FIG. 4

| | Resource allocation | Congestion control | In-device coexistence logic | Power Control |
|---|---|---|---|---|
| Priority | Sidelink sensing, scheduling and resource selection | Prioritization of packets for transmission based on priority, Constraints on L1 TX parameters | RAT prioritization / preemption for TX/RX in case of inter-RAT conflicts | Higher TX power to higher priority transmissions |
| Latency | Sidelink scheduling and resource selection | Prioritization of packets for transmission based on latency | No | No |
| Reliability | Sidelink scheduling, sensing and resource selection aspects | Prioritization of packets for transmissions based on reliability | RAT prioritization / preemption for TX/RX in case of inter-RAT conflicts | Higher TX power to higher reliability transmission |
| Communication Range (if agreed) | Sidelink scheduling aspects | Prioritization of packets for transmissions based on range | No | Higher TX power to longer range transmission |

QOS-AWARE CONGESTION CONTROL, RESOURCE ALLOCATION AND IN-DEVICE COEXISTENCE SOLUTIONS FOR NR V2X SIDELINK COMMUNICATIONS

REFERENCE TO RELATED APPLICATIONS

This application is a National Phase entry application of International Patent Application No. PCT/US2019/059056 filed Oct. 31, 2019, which claims the benefit of U.S. Provisional Application No. 62/754,476 filed Nov. 1, 2018, entitled "METHODS OF QOS-AWARE CONGESTION CONTROL, RESOURCE ALLOCATION AND IN-DEVICE COEXISTENCE SOLUTIONS FOR NR V2X SIDELINK COMMUNICATION", the contents of which are herein incorporated by reference in their entirety.

FIELD

The present disclosure relates to wireless technology, and more specifically to techniques for resource sensing and congestion control for new radio (NR) vehicular communication.

BACKGROUND

Mobile communication, including cellular communication, involves the transfer of data between mobile devices. A type of mobile communication includes vehicle communication, where vehicles communicate or exchange vehicle related information. The vehicle communication can include vehicle to everything (V2X), which includes vehicle to vehicle (V2V), vehicle to infrastructure (V2I) and vehicle to pedestrian (V2P).

In some situations, vehicle related information is intended for a single vehicle or other entity. In other situations, such as emergency alerts, vehicle related information is intended for a large number of vehicles or other device entities. The emergency alerts can include collision warnings, control loss warnings, and the like.

As of today, limited support of Quality of Service (QoS) management is supported by LTE V2X sidelink design. Although there is demand to support multiple new QoS attributes including latency, reliability, priority, communication range that may be translated in energy per bit value attribute. Vehicle related information to multiple vehicles and/or other entities is needed for increased and ongoing safety as well as improving QoS awareness for congestion control, resource allocation, in-device co-existence, latency and reliability of communications.

DETAILED DESCRIPTION

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing circuitry or device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 1:
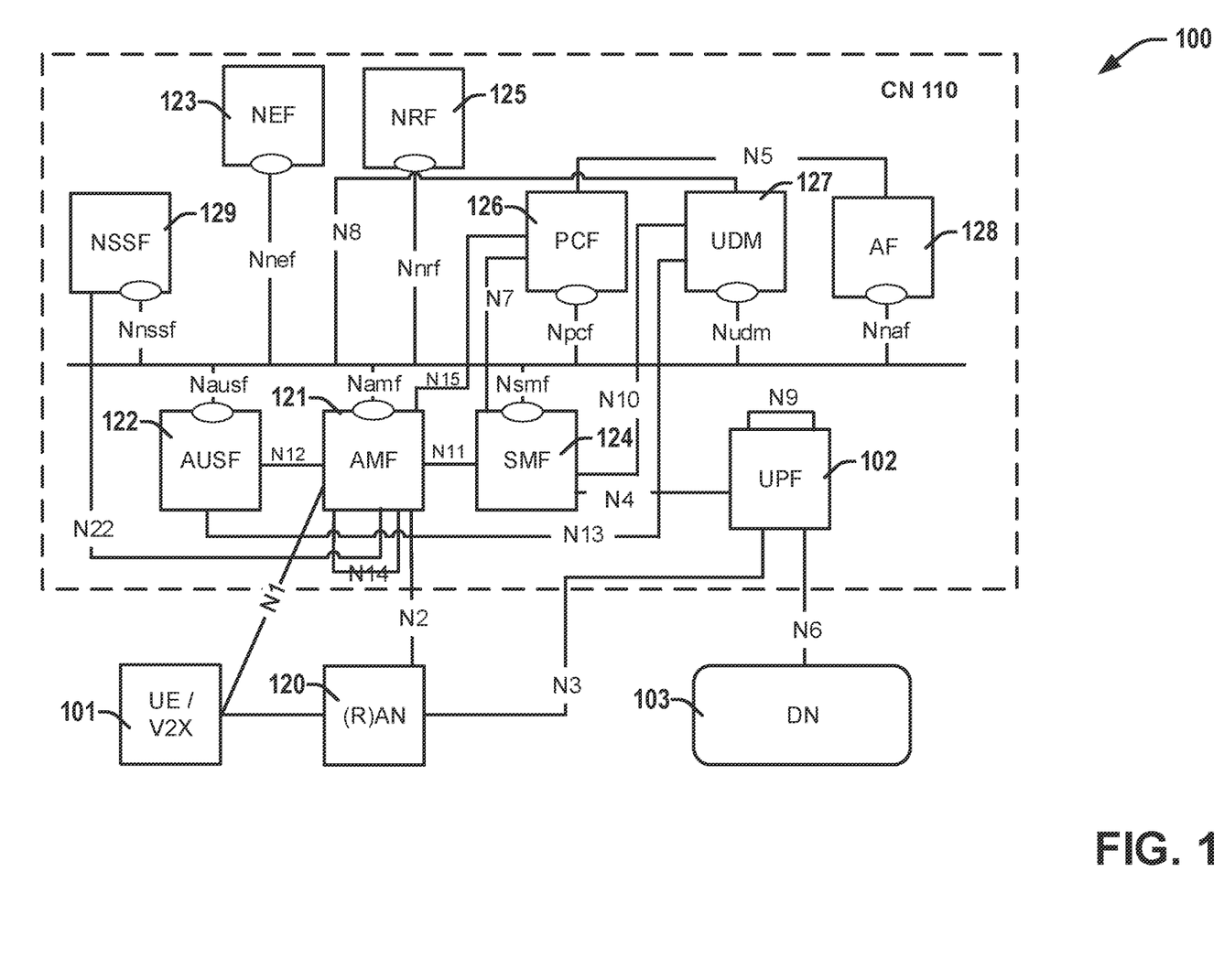
FIG. 1 is a block diagram illustrating an example user equipments (UEs) in a network with network components useable in connection with various aspects described herein.

FIG. 1 illustrates architecture of a system 100 including a core network (CN) 110 in accordance with various embodiments. The system 100 is shown to include a user equipment (UE)/vehicle to everything (V2X) device 101, a radio access network (R)AN 120 or access node (AN), a 5GC 110, and a data network (DN) 103, which can be, for example, operator services, Internet access or 3rd party services.

The UE (as a V2X) 101 can comprise one or more of: vehicles (V2V), vehicles and infrastructure (V2I), vehicles and pedestrians (V2P), or other network device(s)/component(s). In various embodiments, one or more of UE configurations, UE provided information, network provided information, and coverage for the UE can be used to select a V2X RAT for transmission (e.g., DSRC, LTE, 5G, or other RAT). As there are multiple technologies available for V2X communications, some vehicles (via the UE 101) can be equipped with these multiple access technologies for V2X communication and utilize sidelink communication according to these technologies.

The 5GC 110 can include an Authentication Server Function (AUSF) 112, an Access and Mobility Function (AMF) 121, a Session Management Function (SMF) 124, a Network Exposure Function (NEF) 123, a Policy Control Function (PCF) 126, a Network Function Repository Function (NRF) 125, a Unified Data Management (UDM) 127, an application function (AF) 128, a user plane function (UPF) 102, and a Network Slice Selection Function (NSSF) 129. Each of these components can be used for processing corresponding 5GC network functions (NFs) or performance measurements related thereto as network functions associated with any one or more of the embodiments herein.

The UPF 102 can act as an anchor point for intra-RAT and inter-RAT mobility, an external protocol data unit (PDU) session point of interconnect to DN 103, and a branching point to support multi-homed PDU session. The UPF 102 can also perform packet routing and forwarding, perform packet inspection, enforce the user plane part of policy rules, lawfully intercept packets (UP collection), perform traffic usage reporting, perform Quality of Service (QoS) handling for a user plane (e.g., packet filtering, gating, uplink (UL)/downlink (DL) rate enforcement), perform Uplink Traffic verification (e.g., Service Data Flow (SDF) to Quality of Service (QoS) flow mapping), transport level packet marking in the uplink and downlink, and perform downlink packet buffering and downlink data notification triggering. UPF 102 can include an uplink classifier to support routing traffic flows to a data network. The DN 103 can represent various network operator services, Internet access, or third-party services. DN 103 can include, or be similar to, an application server. The UPF 102 can interact with the SMF 124 via an N4 reference point between the SMF 124 and the UPF 102.

The AUSF 122 can store data for authentication of UE 101 and handle authentication-related functionality. The AMF 121 can be responsible for registration management (e.g., for registering UE 101, etc.), connection management, reachability management, mobility management, and lawful interception of AMF-related events, and access authentication and authorization. The AMF 121 can be a termination point for the N11 reference point between the AMF 121 and the SMF 124. The AMF 121 can provide transport for session management (SM) messages between the UE 101 and the SMF 124, and act as a transparent proxy for routing SM messages. AMF 121 can also provide transport for SMS messages between UE 101 and a Short Message Service (SMS) function (SMSF). AMF 121 can act as Security Anchor Function (SEAF), which can include interaction with the AUSF 122 and the UE 101, receipt of an intermediate key that was established as a result of the UE 101 authentication process. Where Universal Subscriber Identity Module (USIM) based authentication is used, the AMF 121 can retrieve the security material from the AUSF 122. AMF 121 can also include a Security Context Management (SCM) function, which receives a key from the SEAF that it uses to derive access-network specific keys. Furthermore, AMF 121 can be a termination point of a RAN CP interface or RAN connection point interface, which can include or be an N2 reference point between the (R)AN 120 and the AMF 121; and the AMF 121 can be a termination point of Non Access Stratum (NAS) layer (N1) signalling, and perform NAS ciphering and integrity protection.

AMF 121 can also support NAS signalling with a UE 101 over an N3 Interworking Function (IWF) interface. The N3 IWF can be used to provide access to untrusted entities. N3IWF can be a termination point for the N2 interface between the (R)AN 120 and the AMF 121 for the control plane, and can be a termination point for the N3 reference point between the (R)AN 120 and the UPF 102 for the user plane. As such, the AMF 121 can handle N2 signalling from the SMF 124 and the AMF 121 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF can also relay uplink and downlink control-plane NAS signalling between the UE 101 and AMF 121 via an N1 reference point between the UE 101 and the AMF 121, and relay uplink and downlink user-plane packets between the UE 101 and UPF 102. The N3IWF also provides mechanisms for IPsec tunnel establishment with the UE 101. The AMF 121 can exhibit a Namf service-based interface, and can be a termination point for an N14 reference point between two AMFs 121 and an N17 reference point between the AMF 121 and a 5G-Equipment Identity Register (EIR).

The UE 101 can register with the AMF 121 in order to receive network services. Registration Management (RM) is used to register or deregister the UE 101 with the network (e.g., AMF 121), and establish a UE context in the network (e.g., AMF 121). The UE 101 can operate in an RM-REGISTERED state or an RM-DEREGISTERED state. In the RM-DEREGISTERED state, the UE 101 is not registered with the network, and the UE context in AMF 121 holds no valid location or routing information for the UE 101 so the UE 101 is not reachable by the AMF 121. In the RM-REGISTERED state, the UE 101 is registered with the network, and the UE context in AMF 121 can hold a valid location or routing information for the UE 101 so the UE 101 is reachable by the AMF 121. In the RM-REGISTERED state, the UE 101 can perform mobility Registration Update procedures, perform periodic Registration Update procedures triggered by expiration of the periodic update timer (e.g., to notify the network that the UE 101 is still active), and perform a Registration Update procedure to update UE capability information or to re-negotiate protocol parameters with the network, among others.

Connection Management (CM) can be used to establish and release a signaling connection between the UE 101 and the AMF 121 over the N1 interface. The signaling connection is used to enable NAS signaling exchange between the UE 101 and the CN 110, and comprises both the signaling connection between the UE and the Access Network (AN)

(e.g., Radio Resource Control (RRC) connection or UE-N3IWF connection for non-3GPP access) and the N2 connection for the UE 101 between the AN (e.g., RAN or memory 230) and the AMF 121.

The SMF 124 can be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM can refer to management of a PDU session, and a PDU session or "session" can refer to a PDU connectivity service that provides or enables the exchange of PDUs between a UE 101 and a data network (DN) 103 identified by a Data Network Name (DNN). PDU sessions can be established upon UE 101 request, modified upon UE 101 and 5GC 110 request, and released upon UE 101 and 5GC 110 request using NAS SM signaling exchanged over the N1 reference point between the UE 101 and the SMF 124. Upon request from an application server, the 5GC 110 can trigger a specific application in the UE 101. In response to receipt of the trigger message, the UE 101 can pass the trigger message (or relevant parts/information of the trigger message) to one or more identified applications in the UE 101. The identified application(s) in the UE 101 can establish a PDU session to a specific DNN. The SMF 124 can check whether the UE 101 requests are compliant with user subscription information associated with the UE 101. In this regard, the SMF 124 can retrieve and/or request to receive update notifications on SMF 124 level subscription data from the UDM 127.

The NEF 123 can provide means for securely exposing the services and capabilities provided by 3GPP network functions for third party, internal exposure/re-exposure, Application Functions (e.g., AF 128), edge computing or fog computing systems, etc. In such embodiments, the NEF 123 can authenticate, authorize, and/or throttle the AFs. NEF 123 can also translate information exchanged with the AF 128 and information exchanged with internal network functions. For example, the NEF 123 can translate between an AF-Service-Identifier and an internal 5GC information. NEF 123 can also receive information from other network functions (NFs) based on exposed capabilities of other network functions. This information can be stored at the NEF 123 as structured data, or at a data storage NF using standardized interfaces. The stored information can then be re-exposed by the NEF 123 to other NFs and AFs, and/or used for other purposes such as analytics. Additionally, the NEF 123 can exhibit a Neff service-based interface.

The NRF 125 can support service discovery functions, receive NF discovery requests from NF instances, and provide the information of the discovered NF instances to the NF instances. NRF 125 also maintains information of available NF instances and their supported services.

The UDM 127 can handle subscription-related information to support the network entities' handling of communication sessions, and can store subscription data of UE 101. For example, subscription data can be communicated between the UDM 127 and the AMF 121 via an N8 reference point between the UDM 127 and the AMF. The UDM 127 can include two parts, an application FE and a Uniform Data Repository (UDR) (the FE and UDR are not shown by FIG. 2). The UDR can store subscription data and policy data for the UDM 127 and the PCF 126, and/or structured data for exposure and application data (including PFDs for application detection, application request information for multiple UEs 101) for the NEF 123.

The NSSF 129 can select a set of network slice instances serving the UE 101. The NSSF 129 can also determine allowed NSSAI and the mapping to the subscribed single Network Slice Selection Assistance Information (S-NSSAIs), if needed. The NSSF 129 can also determine the AMF set to be used to serve the UE 101, or a list of candidate AMF(s) 121 based on a suitable configuration and possibly by querying the NRF 125. The selection of a set of network slice instances for the UE 101 can be triggered by the AMF 121 with which the UE 101 is registered by interacting with the NSSF 129, which can lead to a change of AMF 121. The NSSF 129 can interact with the AMF 121 via an N12 reference point between AMF 121 and NSSF 129; and can communicate with another NSSF 129 in a visited network via an N31 reference point (not shown by FIG. 2). Additionally, the NSSF 129 can exhibit a Nnssf service-based interface.

Figure 2:
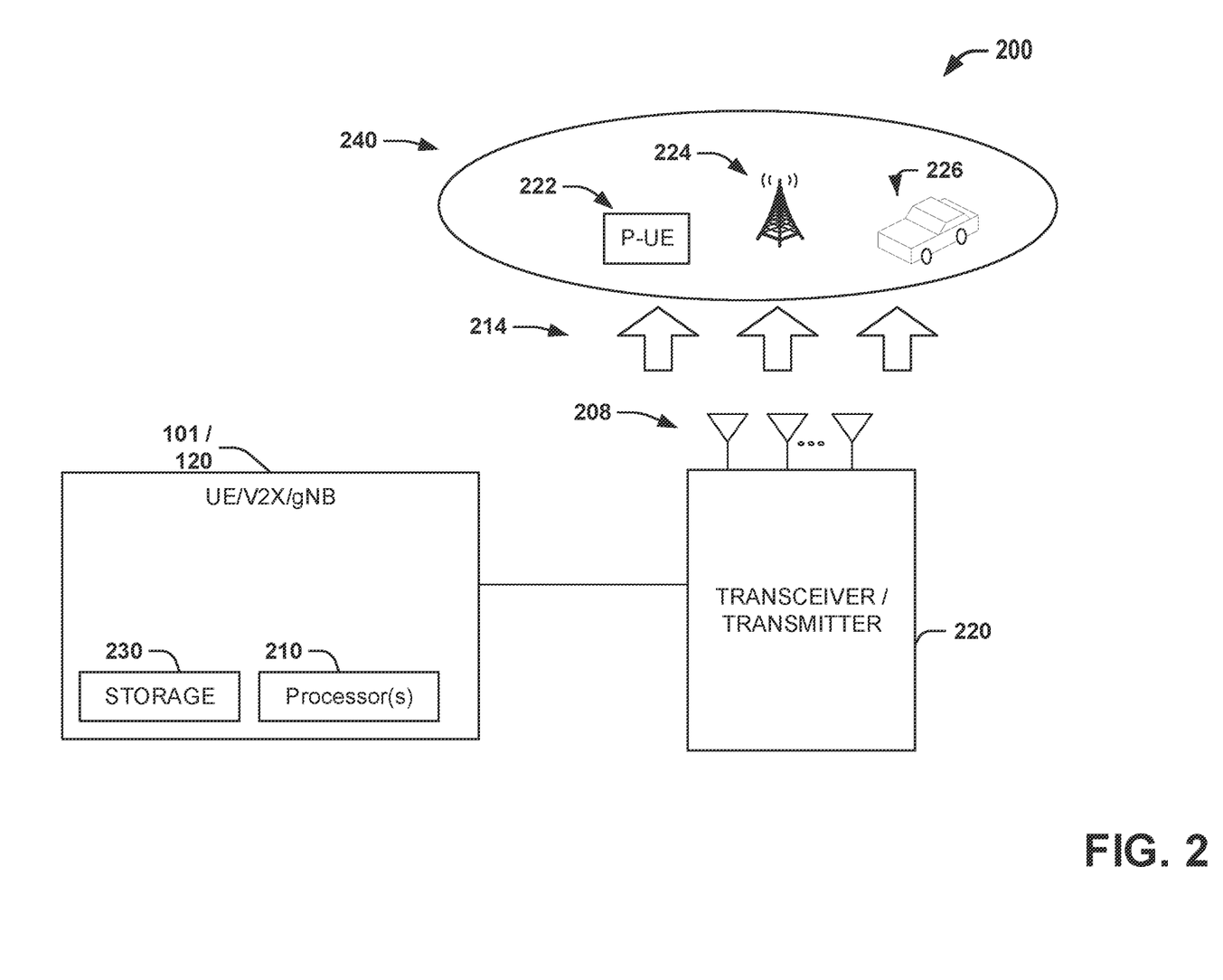
FIG. 2 is a diagram illustrating example components of a device that can be employed in accordance with various aspects discussed herein.

Referring to FIG. 2, illustrated is a block diagram of a system 200 employable at a UE (User Equipment)/V2X Node 101, (or RAN 120) a next generation Node B (gNodeB or gNB) or other BS (base station)/TRP (Transmit/Receive Point), or a component of a 3GPP (Third Generation Partnership Project) network (e.g., a 5GC (Fifth Generation Core Network)) component such as, in embodiments. System 200 can include processor(s) 210 comprising processing circuitry and associated interface(s) (e.g., a communication interface for communicating with communication circuitry 220, a memory interface for communicating with memory 230, etc.), communication circuitry 220 (e.g., comprising circuitry for wired and/or wireless connection(s), e.g., transmitter circuitry (e.g., associated with one or more transmit chains) and/or receiver circuitry (e.g., associated with one or more receive chains). This transmitter circuitry and receiver circuitry of transceiver 220 can employ common or distinct circuit elements, or a combination thereof). The memory 230 can comprise any of a variety of storage mediums and can store instructions or data associated with one or more of processor(s) 210 or the communication circuitry 220. Specific types of embodiments (e.g., UE embodiments) can be indicated via subscripts (e.g., system 200 comprising processor(s) 210 (e.g., of a UE), communication circuitry 220, and memory 230). In BS embodiments (e.g., system 200 of a gNB) and network component (e.g., UPF (User Plane Function), etc.) embodiments (e.g., system 200 of a UPF) processor(s) 210 of the gNB (etc.), communication circuitry 220 (etc.), and memory 230 (etc.) can be in a single device or can be included in different devices, such as part of a distributed architecture. In embodiments, signaling or messaging between different embodiments of system 200 can be generated by processor(s) 210, transmitted by communication circuitry 220 over a suitable interface or reference point (e.g., N4, etc.), received by communication circuitry 220, and processed by processor(s) 210.

The UE 101 can receive V2X configuration information when the UE is authorized to use V2X services over the 3GPP network. This authorization is done by a V2X function in the core network, and part of the authorization procedure the V2X function can send a list of preferred air interface technologies. Alternatively, V2X configuration can be performed by an application server that is not part of the core network. The UE 101 can employ one or more channel quality measurements (e.g., RSRP, etc.) in connection with associated threshold(s) to determine if a preferred RAT should be employed for V2X communication, or if a lower priority RAT should be employed.

UEs can be in a given coverage area inside a cell covered by an eNB that supports 5G, LTE and DSRC road side unit (RSU) functionality. The UEs can notify the gNB/RSU which V2X communication RAT(s) is/are supported. Based on that information, the network can choose an access technology for the UEs to use. The system 200 includes vehicle/traffic participant entities 240. The vehicle/traffic participant entities 240 include one or more pedestrians devices (P-UEs) 222, infrastructure entities 224 (e.g., RAN 120), vehicle entities 226, or other network device(s)/component(s). The V2X UE 101 can also include one or more antenna 208 for communications, which includes sidelink communications 214 with the vehicle/traffic participant entities 240.

The vehicle communications between the V2X UE 101 and one or more of vehicle/pedestrian device entities 240 utilize co-operative awareness that includes information from other vehicles, sensors and the like, to process and share the information to provide vehicle services such as collision warning, autonomous driving, and the like.

The V2X UE 101 is configured to obtain, select or determine QoS attributes associated with sidelink communications. Communications/communication configurations herein can include transmission resources, a frame structure design, a transmit power for broadcast (communication), a subframe structure, a modulation and coding scheme (MCS), number of occupied sub-channels/Time Transmission Intervals (TTIs), a resource reservation interval/period, range of transmission per transport block (TB), channel busy ratio (CBR), channel occupancy ratio (CR), CR limit (CR_limit), associated LTE parameters in 3GPP, or the like. For example, the frame structure has parameters including sampling rate, frame length, subframe length, subcarrier spacing and cyclic prefix length and are based on the obtained success ratio.

In general, the principles of sensing and resource selection procedure can be used for sidelink communication management, including QoS aware congestion control, resource allocation and in-device coexistence solutions, as well as sidelink sensing and resource selection schemes. A resource (re)selection triggering mechanism can be used that can respond to the amount of time when resource reselection is triggered.

The resource (re)selection triggering utilized herein can include a resource reselection counter, a probabilistic reselection based on a probability to reselect one or more resources, and one or more reselection triggering conditions including whether the UE 101, for example, skips transmission on a preconfigured/predetermined number of resource reservation cycles. In particular, modifications could be considered in a resource exclusion operation.

Additionally or alternatively, resource (re)selection procedure/operations can include a resource exclusion, an iterative formation of a candidate resource set, SL-RSSI averaging of remaining resources, resource ranking and a randomized selection of resources from candidate resource set with minimum received energy.

For resource exclusion each UE 101 or 240 can contain the list of already occupied resources (e.g., physical resource blocks, bandwidth, frequency, reserve intervals, etc.) and can know which ones are occupied by neighbor UEs and other devices. Information about occupied resources may be indicated in communication directly or over a network. Each vehicle and the pedestrian UE monitors the medium and detects the control channel, for example, so it knows the resources being used by some concurrent users/UEs 101 and is able to better independently select its own resources for use.

Embodiments herein include various mechanisms and operations for QoS aware sidelink communication between V2X/UEs 101, as well as with network components or gNB 120 of a 5GC of an NR network. These mechanisms and operations include: QoS aware congestion control; QoS control and adaptation; QoS aware resource allocation; QoS aware in-device coexistence solutions; and sensing and reservation based sidelink resource allocation scheme.

In an embodiment, the QoS aware congestion control comprises UE behavior in a distributed architecture to ensure fair and QoS aware usage of sidelink resources that is based on sidelink sensing and measurements procedures. While congestion control itself does not necessarily allocate the resources, it does control parameters used for selection/allocation (e.g., a number of frequency sub-channels, a number of retransmissions, etc.). Congestion control is based on measurements of channel congestion (Channel busy ratio (CBR) measurements), channel occupancy ratio measurements (CR), packets QoS attributes and specified rules. Using these measurements, QoS attributes and rules, congestion control controls transmission parameters.

Congestion control, in particular, provides constraints on UE TX parameters or QoS attributes, which can be estimated for QoS adaptation across multiple layers. These can include, for example, one or more of: a range of acceptable latency values/packed delay budget values; a range of acceptable priority values; a range of acceptable reliability values versus packet size; a range of acceptable transmission periods; a range of acceptable amount of resources available for transmission in a given period of time; a range of data rates available for transmission in a given period of time; a range of acceptable communication range values or energy per information bit; or V2X application IDs. The V2X applications IDs can be used at upper layers to decide which traffic can be passed to UE lower layers (filtering of allowed V2X applications based on a medium (level) congestion metrics).

QoS control can include internal to UE function (i.e. intra-UE function) which ensures that incoming to UE V2X traffic is delivered over sidelink respecting its QoS attributes. In particular, pre-defined rules can be configured (e.g., at V2X UE 101 or AN 120) in order to guide packet filtering and scheduling at the UE 101 side based on a Logical sidelink (SL) transmission (TX) Priority, which can be a function of QoS attributes and V2X application IDs. The function, for example, can be represented as follows: Logical SL TX Priority=function (traffic priority, latency, reliability, range, V2X service ID).

Alternatively, or additionally, the pre-defined rules can be configured in order to guide packet filtering and scheduling at the UE side based on a priority order of QoS attributes, e.g., QoS Priority≥QoS Latency QoS Reliability≥QoS Range (QoS Energy per Bit). Thus, if a QoS priority is not discernable or available, then QoS latency can be used for filtering/scheduling, and so forth until a QoS attribute is capable of being utilized.

The QoS aware resource allocation comprises UE behavior for sidelink sensing and resource selection can be dependent on QoS attributes such as latency, priority, reliability, or range.

The QoS aware in-device coexistence solutions/operations comprise RAT prioritization/preemption for TX/reception (RX) in case of inter-RAT conflicts/interference (e.g., NR or LTE) sidelink transmission based on QoS of traffic delivered over PC5 interfaces including priority, latency, reliability, range, or generalized logical sidelink transmission priority or V2X service priority level. Prioritization can be from a ranking, a comparison, predefining or assignment of various transmission parameters/criteria/QoS attributes or the like discussed herein, for example.

The QoS aware resource allocation scheme can comprises a two stage procedure: Stage 1. Formation of candidate resource set: Resource exclusion procedures are based on detected sidelink transmissions and reservation signaling used to form one or more candidate resource sets for sidelink data transmissions; Stage 2. Small scale sensing and channel access: the UE 101 performs small scale/short term sensing within/with a pre-selected candidate resource and selects the first-in-time non-occupied resources as well as reservation for future transmissions based on resources from a candidate resource set.

Any of the embodiments can include the V2X UE 101 or gNB 120 receiving or identifying QoS attributes, and controlling congestion within an enhanced V2X system based on the QoS attributes. This can also include receiving or identifying congestion metrics (e.g., CBR, priority statistics, channel occupancy ratio, etc. and performing QoS adaptation and filtering incoming V2X traffic based on the congestion metrics. Performing QoS adaptation and filtering incoming V2X traffic can be based further on QoS attributes as well.

Figure 3:
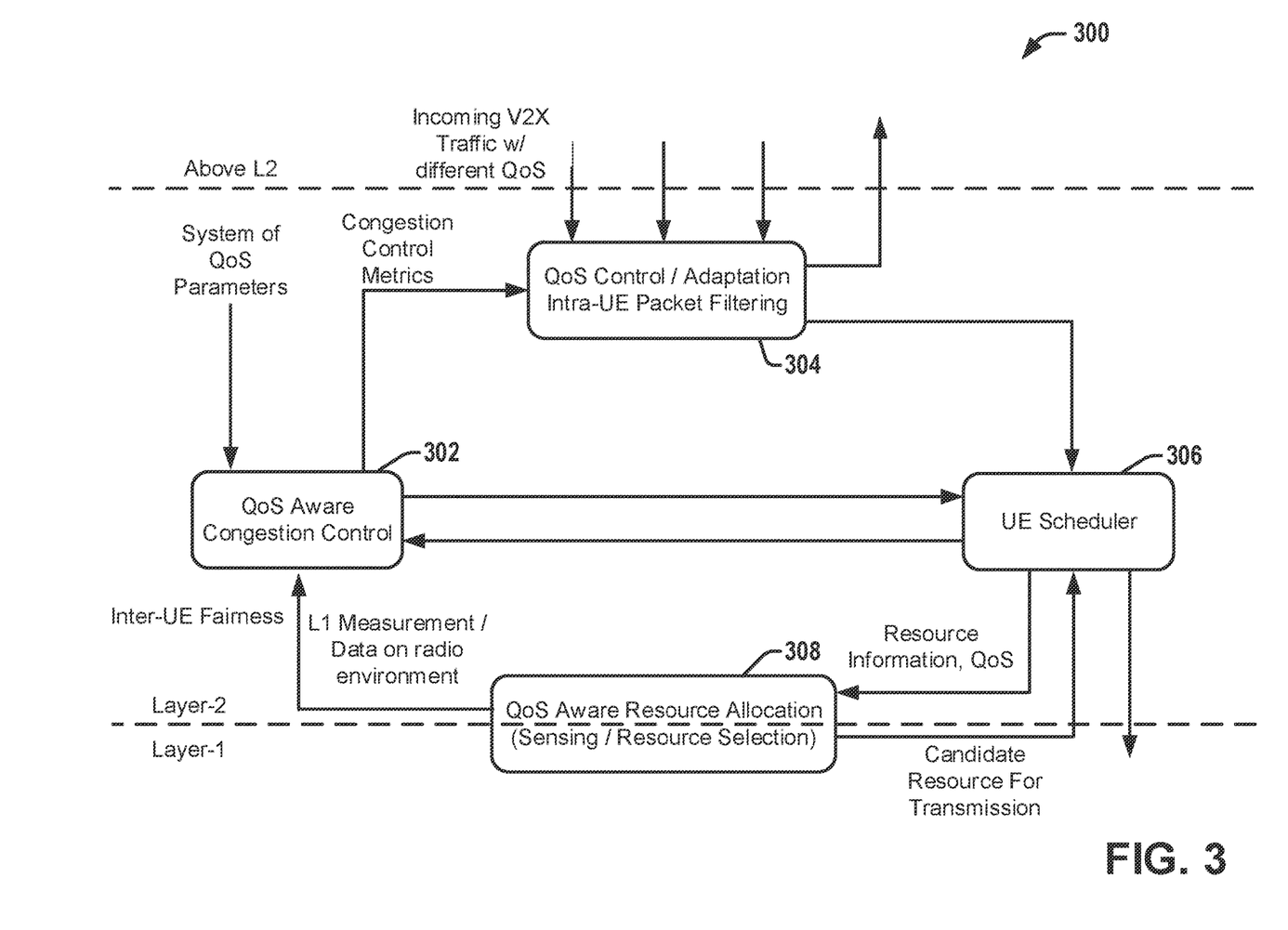
FIG. 3 is example block diagram of a V2X entity showing a V2X device or component selected functional blocks, their interaction and information flows among functional blocks.

Referring to FIG. 3, illustrated is an example protocol architecture 300 for radio layer congestion and QoS aware control for NR to V2X sideline communication according to the embodiments herein. The protocol layers 1 and 2 can include a QoS congestion control component 302, a QoS control/adaptation intra-UE packet filtering component 304, the UE scheduler component 306, a UE scheduler component 306, and a QoS aware resource allocation component 308 for sensing/resource selection. Each of these can be integrated with, or communicatively coupled to, the V2X UE 101, AN 120, or other network component.

Processors of the application circuitry and processors of the baseband circuitry (e.g., controller(s) 210) can be used to execute elements of one or more instances of a protocol stack. For example, processors of the baseband circuitry, alone or in combination, can be used execute Layer 3, Layer 2, or Layer 1 functionality, while processors of the application circuitry can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node.

In various embodiments, QoS management support can be configured according to QoS attribute priority order, such as by comparison or ranking, for example. This QoS attribute priority order can be configurable by network/gNB or pre-configured and used to guide UE behavior for QoS control, congestion control, resource allocation and in-device co-existence operations.

For enhanced V2X (eV2X) use cases, QoS management (control/adaptation) component(s) 304 as well as congestion control component(s) 302 can be utilized foremost. In general, both QoS and congestion control are not physical layer (Layer 10 procedures, but have implications on physical layer design. In addition, the interface relationship between the two components 302, 304 and mechanisms (QoS and congestion control) are illustrated according to various inputs and outputs, given that they can be dependent on each other or considered as a single mechanism.

The QoS aware congestion control component 302 can be configured to control congestion control considerations. The main purpose of congestion control in distributed systems is to ensure fairness (i.e. fair usage of spectrum resources among UEs). In some sense congestion control is a distributed scheduling problem (i.e. inter-UE problem), with only difference that it does not assign specific resource for transmission. Congestion control puts constraints on UE transmitter behavior and transmission parameters. UE 101 or (R)AN 120, for example, comprising the components 300, can utilize component 302 constrain the transmission parameters in terms of amount of resources that can be used for transmission within a given period of time. Other UE TX parameters can be also constrained (e.g., modulation coding scheme (MCS), number of retransmissions, rank, TX power, or the like). The congestion control itself can be a QoS aware or unaware and can be implemented at radio- or application layers, for example. For NR to V2X communications, the QoS aware congestion control component 302 could be supported and at least priority can be used to properly settle TX parameters. As for the QoS attributes/parameters of latency, reliability and communication range, congestion control processes can be used to prioritize low latency, high reliability and short range services and set the minimum or maximum energy that UE 101 can spend per information bit.

Depending on medium congestion at radio-layers based on a set of packets with lower and a set on lower congestion parameters/QoS attributes, the given levels of QoS may not be satisfied. Therefore cross-layer mechanisms with QoS adaptation can be configured by the (R)AN 120 for eV2X services. The UE 101 can report to a higher layer the estimated QoS attributes that are currently valid for sidelink communication in a given period of time on a given carrier or sidelink resource pool such as a range or set of acceptable latency values/packed delay budget values, a range or set of acceptable priority values, a range or set of acceptable reliability values vs packet size, a range or set of acceptable transmission periods, a range or set of acceptable amount of resources available for transmission in a given period of time, a range of data rates available for transmission in a given period of time, a range or set of acceptable communication range values or energy per information bit, a V2X application identifications (IDs), or the other such QoS attributes. The V2X IDs, or other attributes can be used at upper layers to decide which traffic can be passed to UE lower layers (filtering of allowed V2X applications based on medium congestion metrics) and processed by the UE 101, for example.

Alternatively, or additionally to the estimated QoS attributes for QoS adaptation, UEs 101 can provide to upper layers the measured congestion metrics (e.g. CBR, priority statistics, channel occupancy ratio, etc.), so that upper layers or the QoS control/adaptation component 304 can perform QoS adaptation and filter incoming V2X traffic to fit radio-layer conditions and at the same time respect as much as possible QoS attributes.

QoS control considerations for the QoS aware congestion control component 302 or QoS control/adaptation component 304 can have multiple meanings or considerations by which processes are based on. QoS control can comprise an internal to UE function (i.e. intra-UE function). The main operation of this function is to ensure that incoming UE V2X traffic is delivered over sidelink respecting its QoS attributes. In case of system congestion (e.g., via the QoS aware congestion control component 302 or QoS control/adaptation component 304), this can be viewed as a packet filtering problem based on supplied QoS attributes; this function can decide which incoming data should be passed to low layers for further processing. The QoS control is typically not a L1 problem, unless some low layer mechanism such as for example a preemption is defined and affects L1 procedures. For QoS control under resource constraints, pre-defined rules can be configured in order to guide packet filtering and scheduling at the UE side via the QoS control/adaptation component 304. In general, these rules can be left to UE implementation, however for mission critical services like eV2X certain standardization can be defined so that applications can know what can be expected from the radio-layer in case of intra and inter UE conflicts due to resource constraints.

eV2X traffic can be characterized by a combination of QoS attributes including priority, latency, reliability, range, or other attributes. In the case of resource constraint(s), in order to schedule a packet some common rules can be defined. For example, UE behavior to handle packets with different priority, latency or reliability, etc. can be addressed, such as how to handle packet(s0 with low latency and low reliability with respect to a packet with a higher latency and a higher reliability. In one aspect, a way to handle this is to define a global logical transmission priority value that can be a function of packet priority, latency, reliability, V2X service ID, range, etc., as in the following representative function: Logical SL TX Priority=function (traffic priority, latency, reliability, range, V2X service ID). This function can be defined via the QoS control/adaptation component 304 and used to set unified mapping between QoS attributes V2X applications and one scalar value that can be useful for prioritization of certain packet transmissions in case of resource constraint or overload. This function can be also tabulated (i.e., one-to-one mapping between QoS attributes and logical priority can be defined) as illustrated in the example mapping 400 of FIG. 4.

Figure 4:
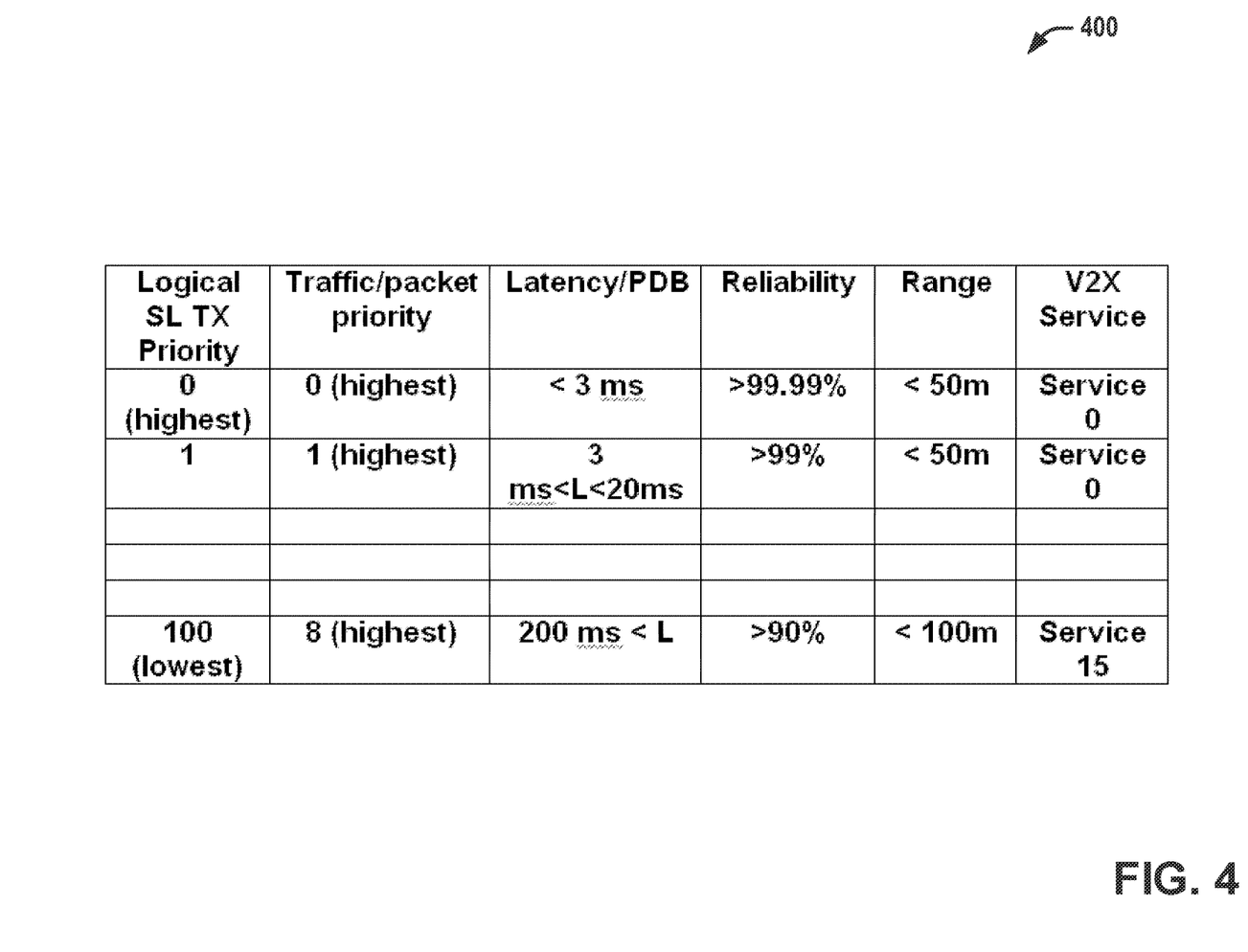
FIG. 4 is an example mapping of QoS attributes to logical priority employable at a network device that facilitates sidelink QoS aware transmissions according to various aspects described herein.

This function as the mapping 400 example could be also dependent on radio-layer conditions/characteristics. In an alternative, or additional embodiment, certain priority value(s) can be assigned to each QoS attribute. For example, the highest priority can be given to a QoS priority attribute, then to a QoS latency attribute and then reliability or a communication range attribute, in a particular hierarchical order (e.g., from highest to lowest, vice versa or other ranking order). One way to formulate it, for example, is to assign priority order for handling packets with different sets of QoS attributes as in the following example ordering: QoS Priority≥QoS Latency≥QoS Reliability≥QoS Range (QoS Energy per Bit).

A priority order of QoS attributes as exemplified above indicates that the UE 101 could prioritize transmission of packets/traffic with higher priority, then prioritize (activate for controlled use) lower or higher latency followed by a higher or lower reliability related thereto, and finally by short or long range respectively. The specific rule for QoS attribute prioritization can be configured by the network, a network component/device, or the gNB 120, for example. In addition to priority order, the UE 101 can be preconfigured for whether to first handle packets with high or low latency remaining packet delay budget (PDB), high or low reliability, long or short communication range, etc. In addition, the UE 101 can take into account congestion control constraints or radio-conditions, and if a QoS attribute is not satisfied, the UE 101 can report this status to upper layers for QoS adaptation purposes (e.g., via the QoS control/adaptation component 304). In a particular QoS attribute is realized that certain attribute cannot be met, the UE 101 can start handling another QoS attribute in priority order.

The UE scheduler 306 can operate QoS based on the QoS impact on sidelink (SL) physical layer aspects. Priority, latency, reliability, minimum required communication range, or the like attributes can be used in physical layer aspects of resource allocation, congestion control, in-device coexistence, or power control. Power control can also be considered as a part of other mechanisms, including resource allocation, congestion control or in-device coexistence, for example.

Figure 5:
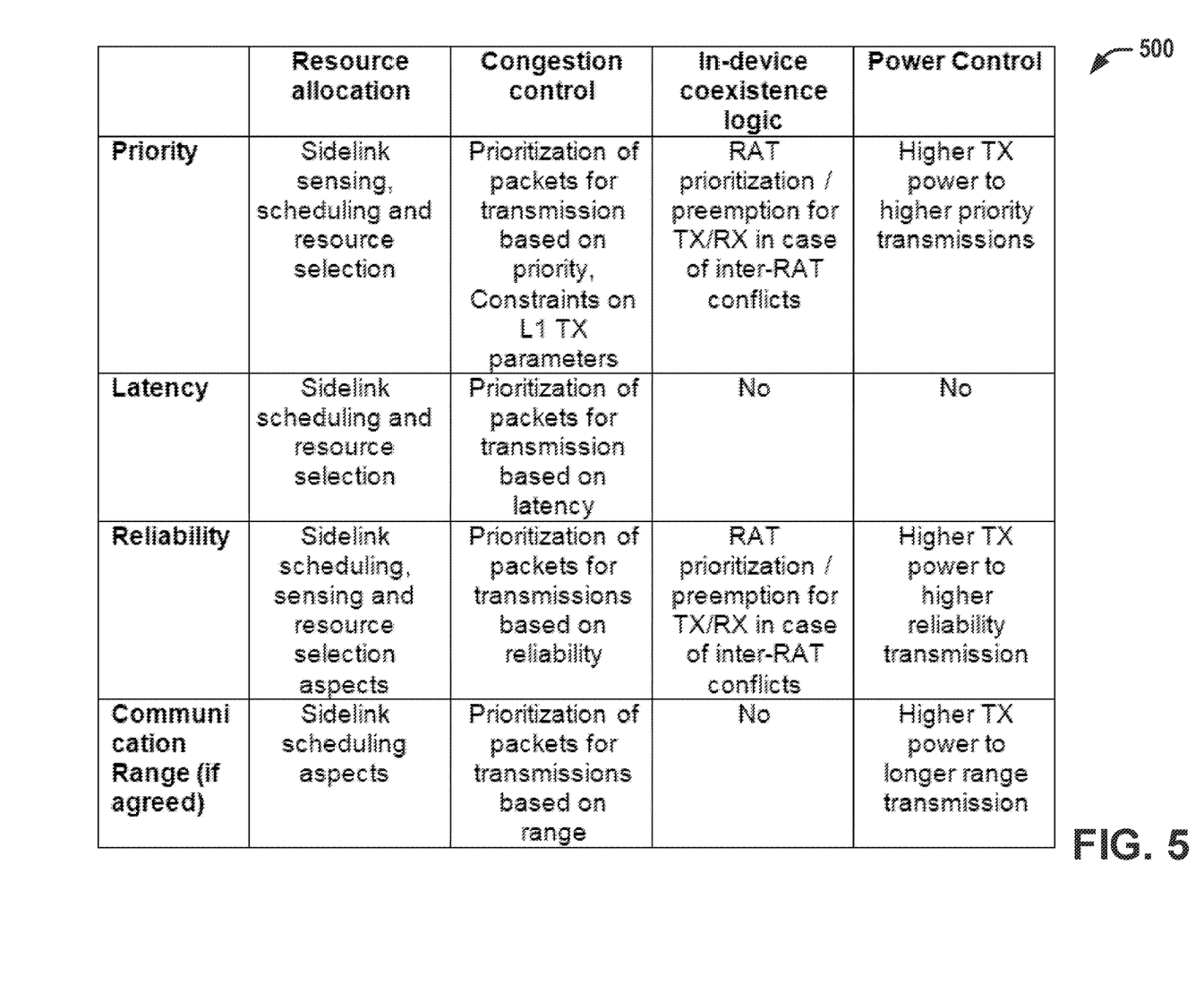
FIG. 5 is an example impact description of QoS attributes on resource allocation, congestion control, in-device coexistence and power control to facilitate sidelink QoS aware transmissions according to various aspects described herein.

Referring to FIG. 5, illustrated is an table 500 demonstrating an impact of QoS attributes on resource allocation, congestion control, in-device coexistence and power control, where a given QoS attribute (each row in the table) can be assumed that other QoS parameters have the same settings (i.e., no inter-dependency among QoS attributes). The in-device coexistence problem here assumes scenario where V2X service/traffic is delivered through LTE PC5 air-interface in one frequency channel (F1) and another V2X service/traffic is delivered through NR PC5 air-interface in frequency channel (F2), for example. As such, the band frequency allocation F1 and F2 channels can be adjacent and thus transmission on one channel can create problem for reception in another channel as an interference, for example. In addition, depending on UE implementation power sharing problems can happen in case of simultaneous transmission across RATs. Considering that traffic on different RATs can have different priorities, it can be desirable to have a coordination between RAT and force preemption of sidelink transmission on one RAT if it creates problem for transmission of reception of V2X services with higher hierarchy in terms of QoS attributes (e.g. priority, latency, reliability, range, or generalized logical sidelink transmission priority or simply service priority level). As such the processing circuitry of the scheduler 306 or other component of protocol layers 300 can be configured to generate a QoS aware in-device coexistence operation comprising a coordination between different Radio Access Technologies (RATs) of one or more network devices by defining a priority of one RAT over another RAT during a concurrent transmission across the RATs based on QoS attributes of packets being delivered over the different RATs. Alternatively, or additionally, the QoS aware in-device coexistence operation can include allocating a greater transmit power to a first packet with a higher priority than a second packet based on the QoS attributes.

The QoS aware resource allocation component 308 can provide a sidelink resource allocation enhancement for NR-V2X communication. The resource allocation scheme is optimized for periodic traffic. NR V2X communication could support diverse set of traffic patterns with potentially high variations in packet arrival time and packet sizes including periodic and aperiodic traffic. Therefore, enhancements to handle aperiodic traffic can be configured to the sidelink resource allocation and (re)selection procedure.

For example, the QoS aware resource allocation component 308 or the UE 101 can identify resources occupied by sidelink transmissions from other UEs. Here, information can be received from received control channels and radio measurements used to identify occupied resources. The UE 101, for example, forms one or more sets of candidate resources (e.g., transmission parameters or QoS attributes)

that can be used for sidelink transmission. The UE 101 can then select resources from a particular set of candidate resources (less congested/non-occupied resources). A drawback of this approach is that several UEs reselecting resources at the same time or concurrently can eventually select the same resource for sidelink transmission and be unaware about collision for a whole resource reservation, if it is applied. In order to address these issues as well as handle aperiodic traffic, various further enhancements are configured for NR-V2X sidelink communication.

In one example embodiment, a network component (e.g., the QoS aware resource allocation component 308, or processing circuitry) can configure resource selection granularity. Resource selection can be performed, for example, based on frequency sub-channels and LTE subframes. For NR V2X communication, resource aggregation can be applied. For example, if channel access granularity is equal to a slot, then two contiguous in time slots can be aggregated as a minimum resource granularity in time for transmissions. If channel access granularity is half of a slot, then the minimum resource granularity in time can be a slot. the QoS aware resource allocation component 308 can configure a single transmission duration as a multiple of several channel access occasions (e.g., N channel access occasions, where N≥2).

Figure 6:
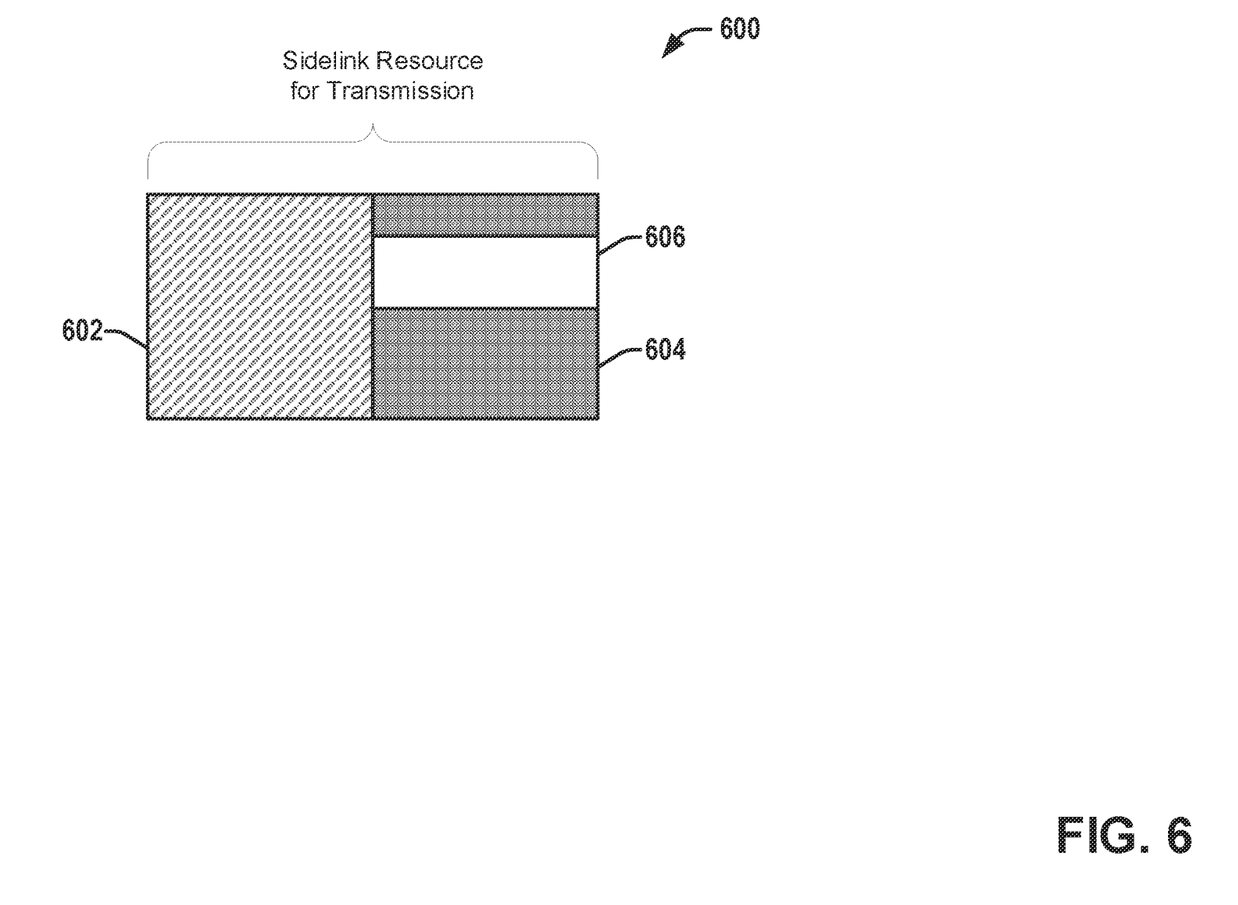
FIG. 6 is an example configuration of a sidelink resource for sidelink transmission at a network device according to various aspects described herein.

Referring to FIG. 6, illustrated is an example resource selector granule or transmission for resource sensing. The QoS aware resource allocation component 308 can operate for sensing and resource selection for the sidelink resource for transmission 600. When the UE 101 attempts to access the sidelink channel, it can perform a short term sensing procedure. The UE 101 can perform measurements (e.g., sidelink received signal strength indicator (SL-RSSI), or sidelink reference signal received power (SL-RSRP) or physical sidelink control channel (PSCCH) decoding) at the beginning part 602 of the sidelink channel access occasion. If channel access criteria on a candidate sidelink resource (e.g., frequency or subset frequency) is met/satisfied, the UE 101 accesses the sidelink channel and transmits from the second half 604 of the resource. If channel access criteria is not met, UE makes back-off and performs short term sensing on other candidate resource. A part of the transmission resource is allocated for short term sensing, e.g. the first half of resource 602 is used for sensing and detection of concurrent/competing transmissions as illustrated. The second half 604 is used for transmission based on a portion of subset 606 of the second half 604.

The QoS aware resource allocation component 308 can operate medium sensing, which can include the following options: SL RSSI measurements, SL-RSRP measurements, or control and data channel detection. In one embodiment, sensed resources can be considered as non-occupied, if measured SL-RSSI or SL-RSRP is less than one or more predefined thresholds. In another embodiment, information from detected control or data channels can also be used to determine resources as occupied. Resource selection can be configured for control information signaling. Once the UE 101 accesses the sidelink channel (e.g., not busy, or is idle from short sensing or the like process), it can send control signaling PSCCH and PSSCH in the second half 604 of resource. The control signaling can carry resource reservation for upcoming transmissions and future transmissions, HARQ feedback, CSI/CQI reporting or other feedback.

In an embodiment, to select resources for transmission, the following two stage resource selection procedure a stage 1, stage 2 or both can be used. Stage 1 includes formation of candidate resource set, where resource exclusion procedure based on detected sidelink transmissions and reservation signaling used to form candidate resource set for sidelink data transmissions. Stage 2 can include small scale sensing and channel access, where the UE performs small scale/short term sensing within pre-selected candidate resource and selects the first in time non-occupied resources as well as reservation for future transmissions based on resources from candidate resource set.

Figure 7:
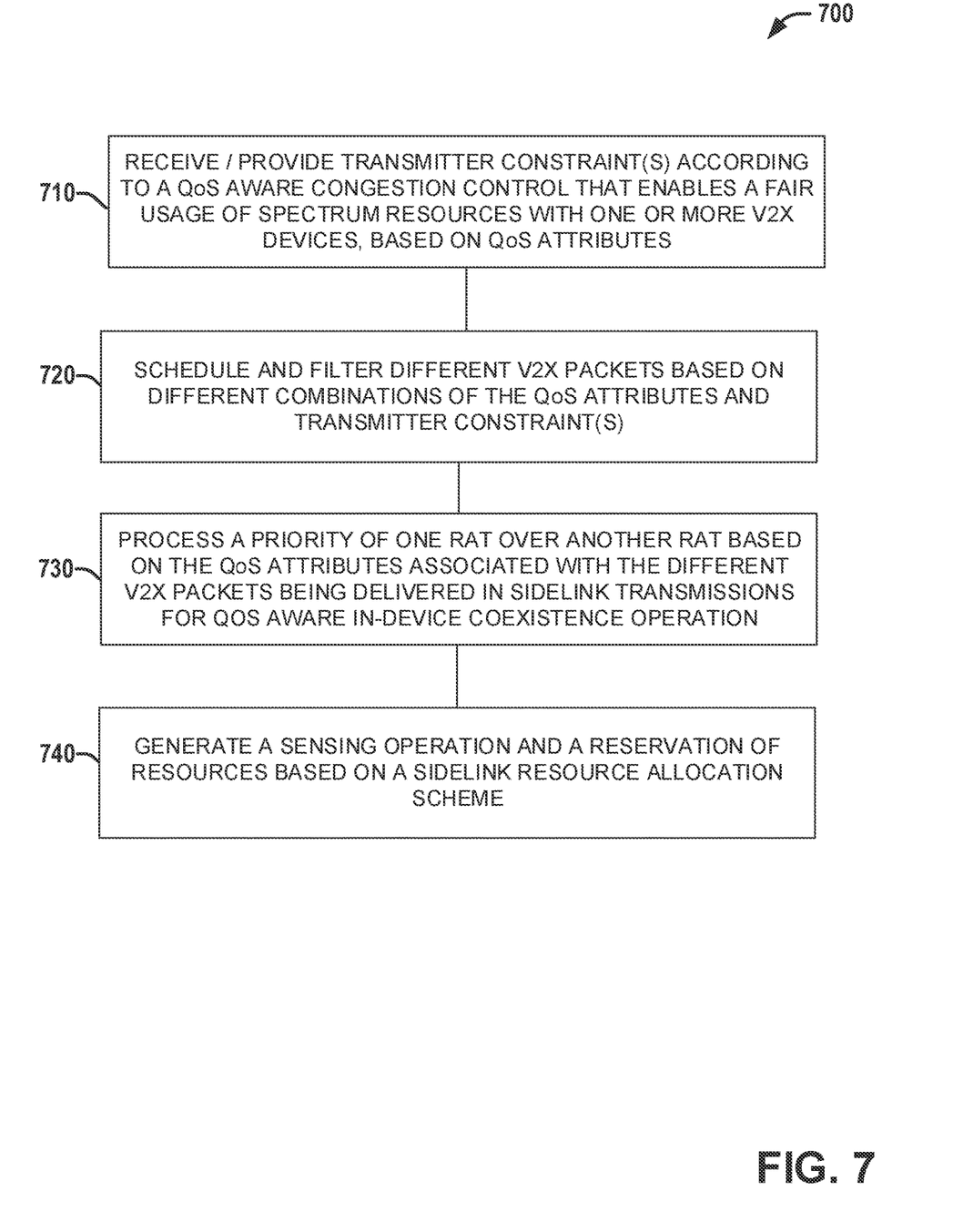
FIG. 7 a flow diagram of an example process flow employable at a network device for V2X sidelink communications according to various aspects described herein, according to various aspects discussed herein.

Referring to FIG. 7, illustrated is a process flow 700 for QoS aware congestion control, resource allocation, and in-device coexistence for NR V2X sidelink communications.

At 710, the process flow 700 comprises receiving/providing one or more transmitter constraints according to a Quality of Service (QoS) aware congestion control that enables a fair usage of spectrum resources with one or more V2X devices, based on QoS attributes.

At 720, the process flow 700 includes scheduling and filtering different V2X packets based on different combinations of the QoS attributes and the one or more transmitter constraints.

At 730, the process flow 700 includes processing a priority of one radio access technology (RAT) over another RAT based on the QoS attributes associated with the different V2X packets being delivered over the one RAT and the another RAT in sidelink transmissions for a QoS aware in-device coexistence operation.

At 740, the process flow 700 includes generating a sensing operation and a reservation of resources based on a sidelink resource allocation scheme that comprises forming a candidate resource set based on detected sidelink transmissions for sidelink data transmissions, performing a small scale/short term sensing with a pre-selected candidate resource of the candidate resource set and selecting one or more first in time non-occupied resources by a reservation from the candidate resource set.

QoS attributes are related to the sidelink communication in a defined period of time on carrier or a sidelink resource pool, and can include one or more of: latency values/packed delay budget values, priority values, reliability values, packet size, transmission periods, amount of resources available for transmission in a given period of time, data rates available for transmission in the given period of time, communication range values, energy per information bit, V2X application IDs, a modulation coding scheme (MCS), number of retransmissions, a rank, or a transmit power, for example.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is an apparatus configured to be employed in a network component of a network device in a Fifth Generation Core Network (5GC), comprising: a memory interface; and processing circuitry configured to: determine Quality of Service (QoS) aware congestion control to ensure fair usage of spectrum resources among vehicle to everything (V2X) devices, based on QoS attributes; and generate QoS resource control and adaptation for intra-user equipment (UE) operation to ensure incoming UE V2X traffic is provided over a sidelink channel with the QoS attributes associated therewith.

A second example can include the first example, wherein the QoS aware congestion control comprises control of allocation of the spectrum resources among the V2X devices based on a prioritization of a latency, reliability and range for services and setting a range of energy to be used per information bit for a V2X device.

A third example can include the first or second example, wherein the QoS aware congestion control is further based on control of transmission parameters comprising at least one of: an amount of resources for transmission within a period of time, a modulation coding scheme (MCS), a number retransmissions, a rank, or a transmit power.

A fourth example can include any one of the first through third examples, wherein the QoS attributes are provided by QoS aware congestion controls for a particular carrier or sidelink resource pool comprising one or more of: latency values/packed delay budget values, priority values, reliability values, packet size, transmission periods, amount of resources available for transmission in a given period of time, data rates available for transmission in the given period of time, communication range values, energy per information bit, or V2X application IDs.

A fifth example can include any one of the first through fourth examples, wherein the processing circuitry is further configured to generate the QoS resource control and the adaptation according to a global logical transmission priority value based on at least one of the QoS attributes by assigning one or more priority values to the QoS attributes, wherein a higher priority of a QoS attribute is given priority over other QoS attributes.

A sixth example can include any one of the first through fifth examples, wherein the processing circuitry is further configured to assign a priority order for handling packets with different sets of QoS attributes or comparing QoS attributes among V2X applications.

A seventh example can include any one of the first through sixth examples, wherein the processing circuitry is further configured to generate a QoS aware resource allocation related to sidelink sensing and resource selection based on one or more QoS attributes associated with a traffic having a channel access granularity being equal to a slot or a half of a slot for UE behavior in NR V2X sidelink communications.

An eighth example can include any one of the first through seventh examples, wherein the processing circuitry is further configured to generate a QoS aware in-device coexistence operation comprising a coordination between different Radio Access Technologies (RATs) of one or more network devices by defining a priority of one RAT over another RAT during a concurrent transmission across the RATs based on QoS attributes of packets being delivered over the different RATs.

A ninth example can include any one of the first through eighth examples, wherein the QoS aware in-device coexistence operation further comprises allocating a greater transmit power to a first packet with a higher priority than a second packet based on the QoS attributes.

A tenth example can include any one of the first through ninth examples, wherein the QoS aware in-device coexistence operation further comprises transmission prioritization of a first packet with a higher priority over transmission of a second packet based on the one or more QoS attributes An eleventh example can include any one of the first through tenth examples, wherein the processing circuitry is further configured to generate a sensing operation and a reservation of resources based on a sidelink resource allocation scheme that comprises forming a candidate resource set based on detected sidelink transmissions for sidelink data transmissions, performing a small scale/short term sensing with a pre-selected candidate resource of the candidate resource set and selecting one or more first in time non-occupied resources by a reservation from the candidate resource set.

A twelfth example can be a computer readable storage medium storing executable instructions that, in response to execution of operations, cause one or more processors of a network device to support sidelink communications for vehicle communication, the operations comprising: determining Quality of Service (QoS) aware congestion control to ensure fair usage of spectrum resources among vehicle to everything (V2X) devices, based on QoS attributes; and generating a QoS aware in-device coexistence operation comprising a coordination between one or more different network devices communicating over different Radio Access Technologies (RATs) by defining a priority of one RAT over another RAT based on the QoS attributes associated with packets being delivered over the different RATs.

A thirteenth example can include the twelfth example, wherein the QoS aware in-device coexistence operation further comprises allocating a greater transmit power to a first packet with a higher priority than a second packet based on the QoS attributes.

A fourteenth example can include any one of the twelfth through the thirteenth examples, wherein the QoS aware in-device coexistence operation further comprises transmission prioritization of a first packet with a higher priority over transmission of a second packet based on the QoS attributes.

A fifteenth example can include any one of the twelfth through the fourteenth examples, wherein the operations further comprise: generating QoS resource control and adaptation for intra-user equipment (UE) operation to ensure incoming UE V2X traffic is provided over a sidelink channel with the QoS attributes associated with the packets.

A sixteenth example can include any one of the twelfth through the fifteenth examples, wherein the operations further comprise: generate a QoS aware resource allocation related to sidelink sensing and resource selection based on one or more QoS attributes associated with a traffic having a channel access granularity being equal to a slot or a half of a slot, and in response to the channel access granularity being equal to the slot, a minimum resource granularity for transmission comprises two contiguous in time slots, and in response to the channel access granularity being equal to the half of the slot, the minimum resource granularity for transmission comprises the slot.

A seventeenth example can include any one of the twelfth through the sixteenth examples, the operations further comprise: providing a global logical transmission priority value based on the QoS attributes for V2X traffic to determine a logical sidelink transmit priority as a function, wherein the function is based on a mapping of the QoS attributes to a priority or a priority ranking, or based on a priority value assigned to each QoS attribute; or assign a priority order for handling packets with different QoS attributes.

An eighteenth example can be an apparatus configured to be employed in a network component of a user equipment (UE) to support a sidelink communication for vehicle to everything (V2X) communication, comprising: a memory interface; and processing circuitry configured to: receive one or more transmitter constraints according to a Quality of Service (QoS) aware congestion control that enables a fair usage of spectrum resources with one or more V2X devices, based on QoS attributes; schedule and filter different V2X packets based on different combinations of the QoS attributes and the one or more transmitter constraints; and process a priority of one radio access technology (RAT) over another RAT based on the QoS attributes associated with the different V2X packets being delivered over the one RAT and the another RAT in sidelink transmissions for a QoS aware in-device coexistence operation.

A nineteenth example can include the eighteenth example, wherein the processing circuitry is further configured to report the QoS attributes that are related to the sidelink communication in a defined period of time on carrier or a sidelink resource pool, the QoS attributes comprising one or more of: latency values/packed delay budget values, priority values, reliability values, packet size, transmission periods, amount of resources available for transmission in a given period of time, data rates available for transmission in the given period of time, communication range values, energy per information bit, V2X application IDs, a modulation coding scheme (MCS), number of retransmissions, a rank, or a transmit power.

A twentieth example includes any one of the eighteenth through nineteenth examples, wherein the processing circuitry is further configured to provide to an upper layer one or more measured congestion metrics comprising a channel busy ratio (CBR), priority statistics, or a channel occupancy ratio (CR) for the upper layer to perform QoS adaptation and filter incoming vehicle to everything (V2X) traffic A twenty-first example includes any one of the eighteenth through twentieth examples, wherein the processing circuitry is further configured to identify resources occupied by the sidelink transmissions from other user equipments (UEs), determine a plurality of candidate resources for sidelink transmission, and select resources from the plurality of candidate resources based on a congestion level or occupation of the resource.

A twenty-second example can include any one of the eighteenth through twenty-first examples, wherein the processing circuitry is further configured to access a sidelink channel by performing a short term sensing procedure, transmit from a second half of a candidate resource of the plurality of candidate resources in response to a channel access criteria being satisfied, and performing a back-off and the short term sensing procedure on another candidate resource in response to the channel access criteria not being satisfied.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A user equipment (UE), comprising:
 a memory comprising a memory interface; and
 processing circuitry, coupled to the memory via the memory interface, configured to:
  receive one or more transmitter constraints according to a Quality of Service (QoS) aware congestion control based on QoS attributes;
  perform measurements of channel congestion on a sidelink channel;
  select, based on the measurements of channel congestion and the one or more transmitter constraints, sidelink resources in the sidelink channel for a sidelink transmission;
  determine, based on the sidelink resources, a priority of a radio access technology (RAT) over another RAT for a vehicle to everything (V2X) packet being delivered in the sidelink transmission;
  access the sidelink channel by performing a short term sensing procedure on a first half of a candidate resource of the sidelink resources;

transmit the V2X packet in the sidelink transmission using the RAT and a second half of the candidate resource in response to a channel access criteria being satisfied; and perform a back-off and the short term sensing procedure on another candidate resource of the sidelink resources in response to the channel access criteria not being satisfied.

2. The UE of claim 1, wherein the processing circuitry is further configured to report the QoS attributes that are related to sidelink communication in a defined period of time on carrier or a sidelink resource pool, the QoS attributes comprising one or more of: latency values of a packet delay budget, priority values, reliability values, packet size, transmission periods, amount of resources available for transmission in a given period of time, data rates available for transmission in the given period of time, communication range values, energy per information bit, V2X application IDs, a modulation coding scheme (MCS), number of retransmissions, a rank, or a transmit power.

3. The UE of claim 1, wherein the processing circuitry is further configured to provide the measurements of channel congestion to an upper layer, the measurements of channel congestion comprising a channel busy ratio (CBR), priority statistics, or a channel occupancy ratio (CR) for the upper layer to perform QoS adaptation and filter incoming V2X traffic.

4. The UE of claim 1, wherein the processing circuitry is further configured to identify resources occupied by sidelink transmissions from other user equipments (UEs), determine a plurality of candidate resources for the sidelink transmission, and select resources from the plurality of candidate resources based on a congestion level or the resources occupied.

5. The UE of claim 1, wherein processing circuitry is further configured to preempt transmission over the another RAT based on the QoS attributes in response to a simultaneous transmission of the one RAT and the another RAT, or a simultaneous transmission and reception of the one RAT and the another RAT.

6. The UE of claim 1, wherein selection of the sidelink resources is based on transmission parameters being within the transmitter constraints, the transmission parameters comprising at least one of: an amount of resources for transmission within a period of time, a modulation coding scheme (MCS), a number of retransmissions, a rank, or a transmit power.

7. A user equipment (UE), comprising:
a memory comprising a memory interface; and
processing circuitry, coupled to the memory via the memory interface, configured to:
receive one or more transmitter constraints according to a Quality of Service (QoS) aware congestion control based on QoS attributes;
perform measurements of channel congestion on a sidelink channel;
select, based on the measurements of channel congestion, the one or more transmitter constraints, and a priority order of the QoS attributes from greatest priority to least priority including: a QoS priority, a latency, a reliability, and a range sidelink resources in the sidelink channel for a sidelink transmission;
determine, based on the sidelink resources, a priority of a radio access technology (RAT) over another RAT for a vehicle to everything (V2X) packet being delivered in the sidelink transmission; and
transmit the V2X packet in the sidelink transmission using the sidelink resources and the RAT.

8. A method of a user equipment (UE), comprising:
receiving one or more transmitter constraints according to a Quality of Service (QoS) aware congestion control based on QoS attributes;
performing measurements of channel congestion on a sidelink channel;
selecting, based on the measurements of channel congestion and the one or more transmitter constraints, sidelink resources in the sidelink channel for a sidelink transmission;
determining, based on the sidelink resources, a priority of a radio access technology (RAT) over another RAT for a vehicle to everything (V2X) packet being delivered in the sidelink transmission;
accessing the sidelink channel by performing a short term sensing procedure on a first half of the sidelink resources;
transmitting the V2X packet in the sidelink transmission using the RAT and a second half of the candidate resource in response to a channel access criteria being satisfied; and
performing a back-off and the short term sensing procedure on another candidate resource of the sidelink resources in response to the channel access criteria not being satisfied.

9. The method of claim 8, further comprising:
reporting the QoS attributes that are related to sidelink communication in a defined period of time on carrier or a sidelink resource pool, the QoS attributes comprising one or more of: latency values of a packet delay budget, priority values, reliability values, packet size, transmission periods, amount of resources available for transmission in a given period of time, data rates available for transmission in the given period of time, communication range values, energy per information bit, V2X application IDs, a modulation coding scheme (MCS), number of retransmissions, a rank, or a transmit power.

10. The method of claim 8, further comprising:
providing the measurements of the channel congestion to an upper layer, the measurements comprising a channel busy ratio (CBR), priority statistics, or a channel occupancy ratio (CR) for the upper layer to perform QoS adaptation and filter incoming vehicle to everything (V2X) traffic.

11. The method of claim 8, further comprising:
identifying resources occupied by sidelink transmissions from other user equipments (UEs), determining a plurality of candidate resources for sidelink transmission, and selecting resources from the plurality of candidate resources based on a congestion level or occupation of the resources identified.

12. The method of claim 8, further comprising:
accessing a sidelink channel by performing a short term sensing procedure, transmit from a second half of a candidate resource of a plurality of candidate resources in response to a channel access criteria being satisfied, and performing a back-off and the short term sensing procedure on another candidate resource in response to the channel access criteria not being satisfied.

13. The method of claim 8, further comprising:
preempting transmission over the another RAT based on the QoS attributes in case of a simultaneous transmission of the one RAT and the another RAT, or a simultaneous transmission and reception of the one RAT and the another RAT.

14. The method of claim 8, wherein the QoS attributes include one or more of: the priority, a latency, a reliability, range, or a sidelink transmission priority or a service priority level.

15. A baseband processor comprising:
a memory;
processing circuitry, communicatively coupled to the memory, configured to, when executing instructions stored in the memory, cause the baseband processor to:
receive one or more transmitter constraints according to a Quality of Service (QoS) aware congestion control based on QoS attributes;
perform measurements of channel congestion on a sidelink channel;
select, based on the measurements of channel congestion and the one or more transmitter constraints, sidelink resources in the sidelink channel for a sidelink transmission;
determine, based on the sidelink resources, a priority of a radio access technology (RAT) over another RAT for a vehicle to everything (V2X) packet being delivered in the sidelink transmission;
access the sidelink channel by performing a short term sensing procedure on a first half of a candidate resource of the sidelink resources;
transmit the V2X packet in the sidelink transmission using the RAT and a second half of the candidate resource in response to a channel access criteria being satisfied; and
perform a back-off and the short term sensing procedure on another candidate resource of the sidelink resources in response to the channel access criteria not being satisfied.

16. The baseband processor of claim 15, wherein the processing circuitry is further configured to report the QoS attributes that are related to sidelink communication in a defined period of time on carrier or a sidelink resource pool, the QoS attributes comprising one or more of: latency values of a packet delay budget, priority values, reliability values, packet size, transmission periods, amount of resources available for transmission in a given period of time, data rates available for transmission in the given period of time, communication range values, energy per information bit, V2X application IDs, a modulation coding scheme (MCS), number of retransmissions, a rank, or a transmit power.

17. The baseband processor of claim 15, wherein the processing circuitry is further configured to provide to an upper layer one or more measured congestion metrics comprising a channel busy ratio (CBR), priority statistics, or a channel occupancy ratio (CR) for the upper layer to perform QoS adaptation and filter incoming vehicle to everything (V2X) traffic.

18. The baseband processor of claim 15, wherein the processing circuitry is further configured to identify resources occupied by sidelink transmissions from other user equipments (UEs), determine a plurality of candidate resources for sidelink transmission, and select resources from the plurality of candidate resources based on a congestion level or occupation of the resources identified.

19. The baseband processor of claim 18, wherein transmitting is from a second half of a candidate resource of the plurality of candidate resources in response to the channel access criteria being satisfied.

* * * * *